United States Patent
Kim

(10) Patent No.: US 10,180,498 B1
(45) Date of Patent: Jan. 15, 2019

(54) SELF-CONTAINED TIME TRANSFER IN PSEUDOLITES

(71) Applicant: The United States of America, as represented by the Secretary of the Army, Washington, DC (US)

(72) Inventor: Yoonkee Kim, Perry Hall, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 42 days.

(21) Appl. No.: 15/682,584

(22) Filed: Aug. 22, 2017

(51) Int. Cl.
*H04W 24/00* (2009.01)
*G01S 19/03* (2010.01)
*G01S 19/23* (2010.01)
*G01S 19/42* (2010.01)

(52) U.S. Cl.
CPC .............. *G01S 19/03* (2013.01); *G01S 19/235* (2013.01); *G01S 19/42* (2013.01)

(58) Field of Classification Search
CPC ................................ G01S 19/03; G01S 19/235
USPC ...................................................... 455/456.1
See application file for complete search history.

(56) References Cited

U.S. PATENT DOCUMENTS

| 9,739,888 B2 * | 8/2017 | Cheng ..................... G01S 19/27 |
| 2008/0129591 A1 * | 6/2008 | Lamance ................ G01S 19/05 |
| | | 342/357.42 |
| 2010/0073228 A1 * | 3/2010 | Smith .................... G01S 19/235 |
| | | 342/357.27 |

\* cited by examiner

*Primary Examiner* — Huy C Ho
(74) *Attorney, Agent, or Firm* — Ronald Krosky; Azza Jayaprakash

(57) ABSTRACT

Various embodiments are described that relate to global position and time information. Two devices can be in communication with one another. The first device can be able to communicate with a satellite system while the second device is unable to communicate with the satellite system. The second device can send a request for global position and time information at a first time that is received by the first device at a second time. At a third time, the first device can send the global position and time information that is received by the second device at a fourth time. The second device can use the first time, second time, third time, and fourth time to compensate for delay caused by the request being sent and the arrival of the information.

20 Claims, 9 Drawing Sheets

SELF-CONTAINED TIME TRANSFER IN PSEUDOLITES

GOVERNMENT INTEREST

The innovation described herein may be manufactured, used, imported, sold, and licensed by or for the Government of the United States of America without the payment of any royalty thereon or therefor.

BACKGROUND

In many cases, a user can benefit from accurate timing to communicate in networked environments. To obtain the beneficial timing accuracy, the user can employ a device that communicates with a satellite system, for example, global navigation satellite system. However, if the device is unable to communicate with the satellite system, then proper communications can be problematic.

SUMMARY

In one embodiment, a system comprises a global navigation satellite system receiver component configured to receive a global position and time information set from a global navigation satellite system. The system also comprises a communication unit receiver component configured to receive a unit request for a local position and time information set from a communication unit unable to receive the global position and time information set from the global navigation satellite system. The system additionally comprises a transmitter component configured to transmit a communication to the communication unit unable to receive the global position and time information set from the global navigation satellite system in response to the unit request. The system further comprises a track component configured to record a time when the unit request is received and a time when the communication is transmitted. The communication comprises a local position information set, the time when the unit request is received, and the time when the communication is transmitted. The global navigation satellite system receiver component, the communication unit receiver component, the transmitter component, the track component, or a combination thereof, is implemented, at least in part, by way of hardware.

In another embodiment, a system comprises a calculation component and a clock update component. The calculation component is configured to calculate a clock offset through use of a time request sent to a pseudolite and through use of a time response received from the pseudolite in response to the time request. The clock update component configured to cause an update to a clock in accordance with the clock offset. The clock is part of an apparatus unable to, at least temporarily, receive a global position information set from a global navigation satellite system. The time response is obtained from the pseudolite as imbedded information in a communication also imbedded with the global position information set. The calculation component, the clock update component, or a combination thereof is implemented, at least in part, by way of non-software.

In yet another embodiment, a non-transitory computer-readable medium stores processor-executable instructions that when executed by a processor cause the processor to perform a method. The method comprises identifying a first time associated with when a request is sent from a slave device to a master device and identifying a second time associated with when the request is received by the master device from the slave device. The method also comprises identifying a third time associated with when the master device sends a response to the request to the slave device and identifying a fourth time associated with when the slave device receives the response from the master device. The method additionally comprises calculating a path delay from the first time, the second time, the third time, and the fourth time, where the slave device is unable to receive a global position and time information set from a global navigation satellite system, where the master device is able to receive the global position and time information set from the global navigation satellite system, and where the master device functions as a pseudolite for the slave device.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
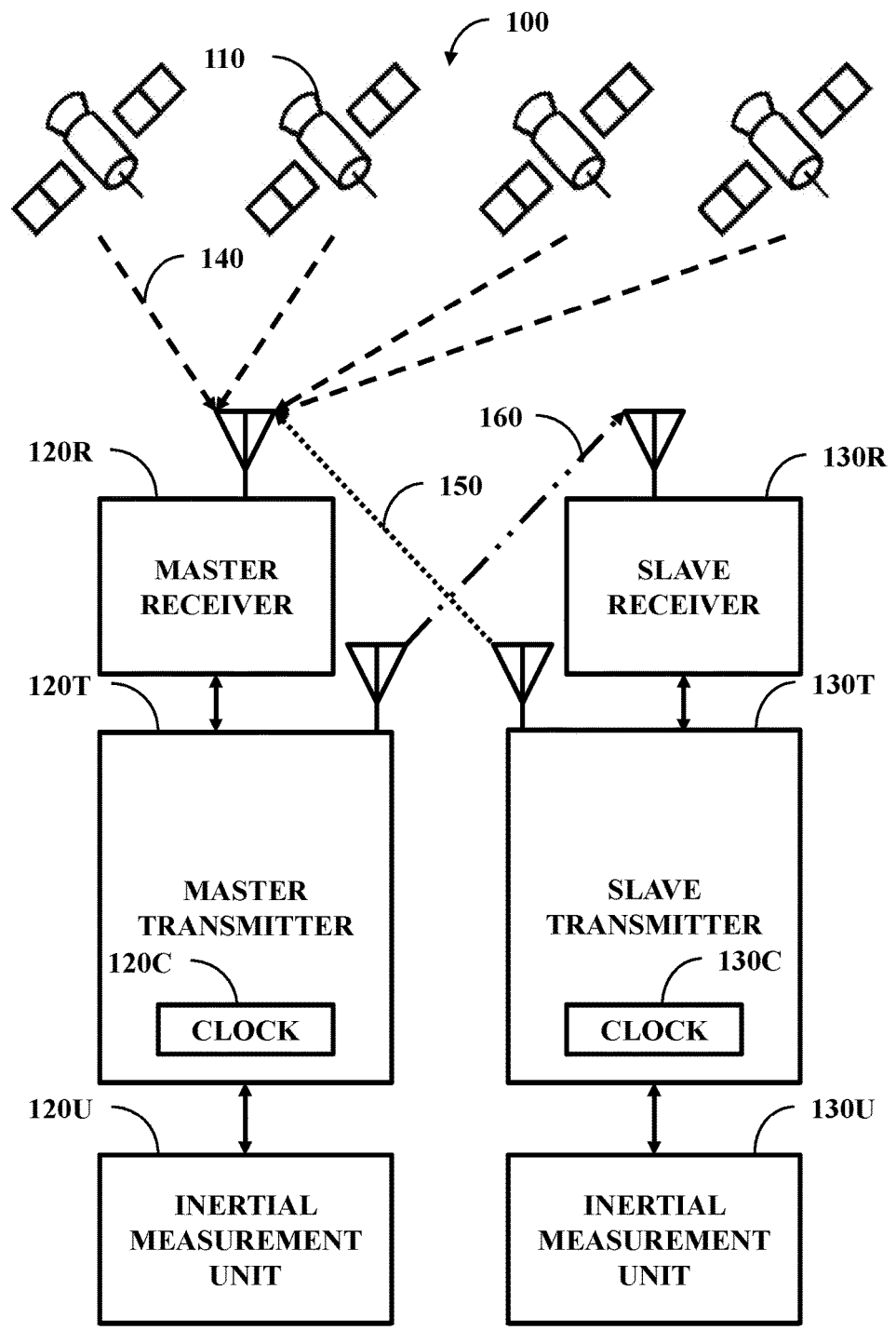
FIG. 1 illustrates one embodiment of an environment with a global navigation satellite system comprising a set of satellites and two devices.

A first device, such as a smart phone equipped with global navigation satellite system capability, can receive signals from a group of satellites in order to determine the first device's location and time. If the device cannot receive the signals from the group of satellites, then the device can communicate with a second device that can receive the signals from the group of satellites. The second device can send global position and time information to the first device and the first device can use the sent global position and time information.

However, the global position and time information, when received by the second device, is not up to date. This is due to a latency in communication between the first device and the second device. The first device can use timestamp information to compensate for the latency.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of an environment 100 with a global navigation satellite system 110 comprising a set of satellites, such as four satellites, and two devices. The devices can have situational designators of a master device 120 and a slave device 130. The master device 120 and slave device 130 are illustrated by their respective components. For the respective components, they have a receiver 120R and 130R, a transmitter 120T and 130T, a clock 120C and 130C, and an inertial measurement unit 120U and 130U.

The device 120 and device 130 can desire to have global position information that can be obtained from the global navigation satellite system 110. In one example, the devices 120 and 130 are military communication devices and can communicate with one another as well as individually with the global navigation satellite system 110. The devices 120 and 130 can individually be outfitted on armored vehicles. The armored vehicle with the device 120 can be on a hilltop while the armored vehicle with the device 130 can be in a valley. Due to being in the valley, the device 130 can be unable to communicate with the global navigation satellite system 110, but can still communicate with the device 120 while the device 120 can communicate with the global navigation satellite system 110.

Since the device 120 can communicate with the global navigation satellite system 110 and the device 130 cannot, the device 120 can take a role of master device while the device 130 can take the roll of slave device. The master device 120 can derive its position from the communication with the global navigation satellite system 110. Since the slave device 130 cannot communicate with the global navigation satellite system 110, the slave device can derive its position from position information of the master device 120.

In this, the master device 120 can, by way of the master receiver 120R, receive a global position information set 140 (e.g., global position and time information set) from the global navigation satellite system 110. In one embodiment, the global position information set 140 is raw data. The master device 120 can employ a component to determine its position.

The master receiver 120R can also receive a unit request 150 for a local position information set. This request 150 can be sent by the slave transmitter 130T. This sending can occur when the slave device 130 is unable to communicate with the global navigation satellite system 110.

The master device 120 can employ the clock 120C. The clock 120C can be used to record time. In one example, the clock 120C can record when the unit request 150 is received by the master receiver 120R.

The master device 120 can create a communication 160 that is sent to the slave device 130 that is a response to the request 150. The clock 120C can record when the master transmitter 120T transmits the communication 160 to the slave device 130. This time can be included in the communication 160 along with the time the request 150 was received by the master receiver 120R and the global position information set 140. In one embodiment, the global position information set 140 can be the same information received from the global navigation satellite system 110 and/or be a master device-specific global position information set (e.g., position information of the master device 120). From the communication 160, the slave device 130 can determine its position without direct access to the global navigation satellite system 110.

The devices 120 and 130 can function in an independent status (e.g., directly communicate with the global navigation satellite system 110) until no longer available. In one example, the receiver 130R can make an identification when it is unable to receive the global position information set 140 (e.g., information relevant to determining a position) from the global navigation satellite system 110. The device 130 can perform a check on if the slave receiver 130R is able to receive the global position information set 140 from the global navigation satellite system 110. If the slave device 130 is able to receive the global position information set 140 directly from the global navigation satellite system 110, then the slave device 130 can do so. If the slave device 130 is not able to receive directly, then the master device 120 can function as a pseudolite that functions as a replacement for the global navigation satellite system 110. The slave transmitter 130T can send the unit request 150 to the pseudolite (e.g., the master device 120) for the global position information set 140 after the slave receiver 130R identifies that communication with the global navigation satellite system 110 is not available.

In one embodiment, roles between the devices 120 and 130 can change. Returning to the above example where the devices 120 and 130 are on vehicles, the vehicles could move such that the device 130 is on a hilltop and able to communicate with the global navigation satellite system 110 and the device 120 is in a valley and incapable of communication with the global navigation satellite system 110. With this, the roles can switch such that the device 130 is the master device and the device 120 is the slave device.

In one embodiment, the device 130 is in a state such that it is unable to communicate with the global navigation satellite system 110 in a relatively permanent manner. In one example, the device 130 is far underground and the device 120 is on the surface. The device 130 can be a fixed or mobile device that can communicate with the device 120, but not the global navigation satellite system 110. With this, the device 130 can have a determined master device (e.g., a fixed or mobile assigned relay) or can choose a master device to use.

Figure 2:
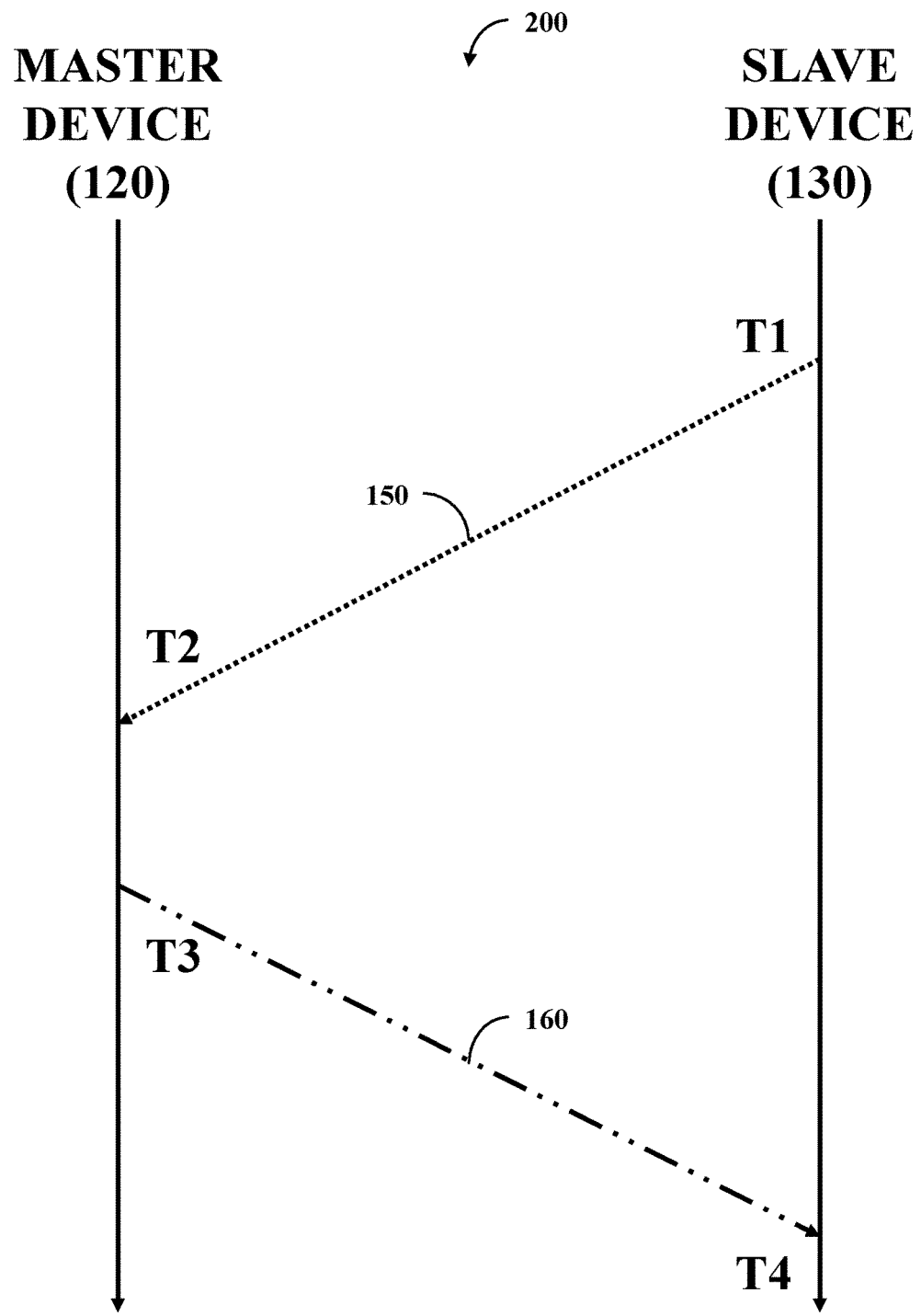
FIG. 2 illustrates one embodiment of a timing sequence.

FIG. 2 illustrates one embodiment of a timing sequence 200. Four times, that can be designated as timestamps, are included in the timing sequence. T1 is a time the slave device 130 sends the unit request 150. T2 is a time the master device 120 receives the unit request 150. T3 is a time the master device 120 sends the communication 160. T4 is a time the slave device 130 receives the communication 160. The slave device 130 can record the time T1 when the unit request 150 is sent and record T4 when the communication 160 is received. The communication 160 can include T2 and T3 along with the global position information set 140 of FIG. 1 (e.g., a timestamp of T2, a timestamp of T3, and the global position information set 140 of FIG. 1 are embedded in a single communication).

The times T1-T4 can be used to update the clock 130C of FIG. 1. The clocks 120C and 130C, both of FIG. 1, can experience a drift from a clock associated with the global navigation satellite system 110 of FIG. 1. The drift can be a when a clock does not run at the same time as a reference clock, here the reference clock being the clock associated with the global navigation satellite system 110 of FIG. 1. The clock 130C can employ the times T1-T4 to compensate for the drift.

In one embodiment, the clock 130C can be associated with a processor. The processor can calculate a clock offset (e.g., the drift) through use of T1-T4. To calculate the clock offset, the processor (e.g., through implementation of a calculation component) can calculate a path delay. To calculate the path delay, a local difference (e.g., local to the slave device 130) and a remote difference (e.g., remote to the slave device 130) can be calculated. The local difference can be T4 minus T1 and the remote distance can be T3 minus T2. The processor can subtract the remote difference from the local difference and divide by 2. This can produce the following equation:

$$\text{Path Delay} = [(T4-T1)-(T3-T2)]/2 \quad (1)$$

The processor can calculate how long the request takes, by subtracting T1 from T2. The path delay can be subtracted from how long the request takes to produce the clock offset. This can produce the following equation:

$$\text{Offset} = (T2-T1) - \text{Path Delay} \quad (2)$$

The processor (e.g., through a clock update component) can cause an update to the clock 130C of FIG. 1 in accordance with the offset.

In a hostile environment or a signal-heavy environment, different signals can be available to the slave device 130. Therefore, the slave device receiver 130R of FIG. 1 can employ an authentication component. The authentication component can be configured to authenticate the communication 160. In one example, if a difference between T1 and T4 is too small (e.g., in comparison to a standard), then the communication 160 can be rejected and another unit request 150 can be sent.

The devices 120 and 130 can retain inertial measurement units 120U and 130U of FIG. 1, respectively. The inertial measurement units 120U and 130U of FIG. 1 can be used to locally track position. In one example, the slave device 130 can receive the global position information set 140 of FIG. 1 and based on this the slave device 130 can update a retained local position. The slave device 130 can have a timer component configured to time a length from when the retained local position was updated and a comparison component configured to compare the length against a threshold to produce a comparison result. If the threshold is not met (e.g., is less than or equal to the threshold), then the slave device 130 can use its own clock 130C of FIG. 1 and local position. However, if the threshold is met (e.g., is equal to or greater than the threshold), then the slave transmitter 130T of FIG. 1 can send out a second unit request 150 for updated position and timing data.

In one embodiment, the processor can comprise a determination component and a generation component. The determination component can be configured to determine if the slave device 130 is able to receive the global position information set 140 of FIG. 1 from the global navigation satellite system 110 of FIG. 1. The generation component can be configured to generate the unit request 150 in response to the slave device 130 being unable to receive the global position information set 140 of FIG. 1 from the global navigation satellite system 110 of FIG. 1. The unit request 150 can also be a request for the global position information set 140 of FIG. 1.

Figure 3:
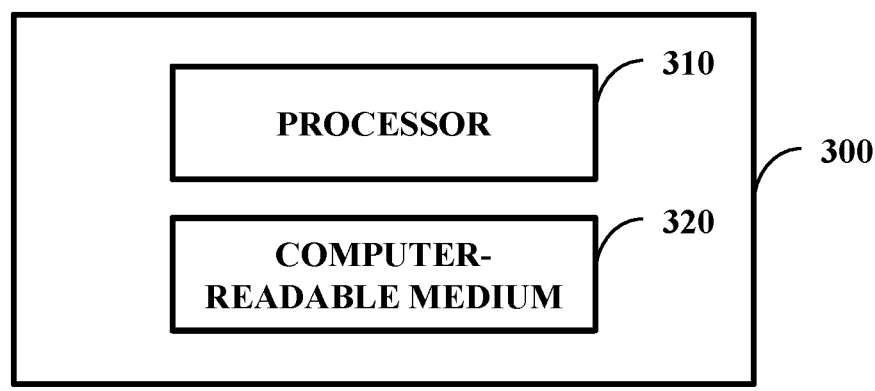
FIG. 3 illustrates one embodiment of a system comprising a processor and a computer-readable medium.

FIG. 3 illustrates one embodiment of a system 300 comprising a processor 310 (e.g., a general purpose processor, processor specifically designed for performing a functionality disclosed herein, or the processor associated with the clock 130C of FIG. 1) and a computer-readable medium 320 (e.g., non-transitory computer-readable medium). In one embodiment, the computer-readable medium 320 is communicatively coupled to the processor 310 and stores a command set executable by the processor 310 to facilitate operation of at least one component disclosed herein (e.g., the calculation component and the clock component discussed above). In one embodiment, at least one component disclosed herein can be implemented, at least in part, by way of non-software, such as implemented as hardware by way of the system 300 (e.g., a global navigation satellite system receiver component, a communication unit receiver component, a transmitter component, and a track component). In one embodiment, the computer-readable medium 320 is configured to store processor-executable instructions that when executed by the processor 310, cause the processor 310 to perform a method, that can be an example algorithm, disclosed herein (e.g., the methods 400-800 addressed below).

Figure 4:
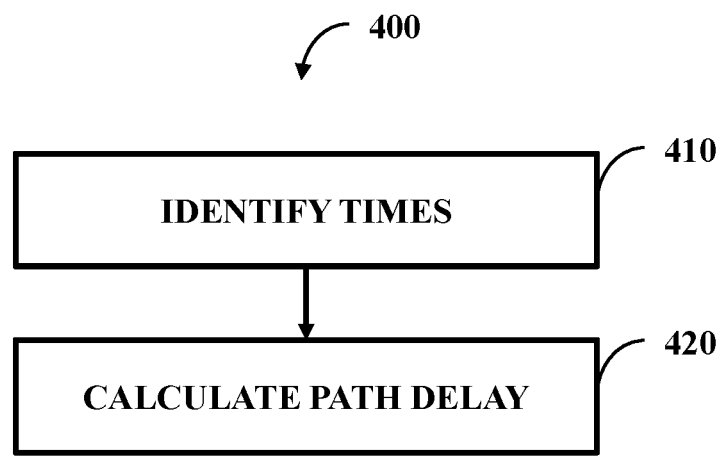
FIG. 4 illustrates one embodiment of a method comprising two actions.

FIG. 4 illustrates one embodiment of a method 400 comprising two actions 410-420. In one embodiment, the method 400 is run by the slave device 130 of FIG. 1 when the slave device 130 of FIG. 1 is unable to receive the global position information set 140 of FIG. 1 from the global navigation satellite system 110 of FIG. 1. The master device 120 of FIG. 1 can function as a pseudolite for the slave device 130 of FIG. 1 when the master device 120 of FIG. 1 is able to receive the global position information set 140 of FIG. 1 from the global navigation satellite system 110 of FIG. 1.

At 410, identifying a first time (e.g., T1 of FIG. 2) associated with when a request (e.g. the unit request 150 of FIG. 1) is sent from the slave device 130 of FIG. 1 to a master device 120 of FIG. 1 can occur. At 410, there can also be identifying a second time (e.g., T2 of FIG. 2) associated with when the request is received by the master device 120 of FIG. 1 from the slave device 130 of FIG. 1. Additionally at 410, there can be identifying a third time (e.g., T3 of FIG. 2) associated with when the master device 120 of FIG. 1 sends a response (e.g., the communication 160 of FIG. 1) to the request to the slave device 130 of FIG. 1. Also at 410, identifying a fourth time (e.g., T4 of FIG. 2) associated with when the slave device 130 of FIG. 1 receives the response from the master device 120 of FIG. 1 can occur. At 420, calculating a path delay from the first time, the second time, the third time, and the fourth time can take place.

Figure 5:
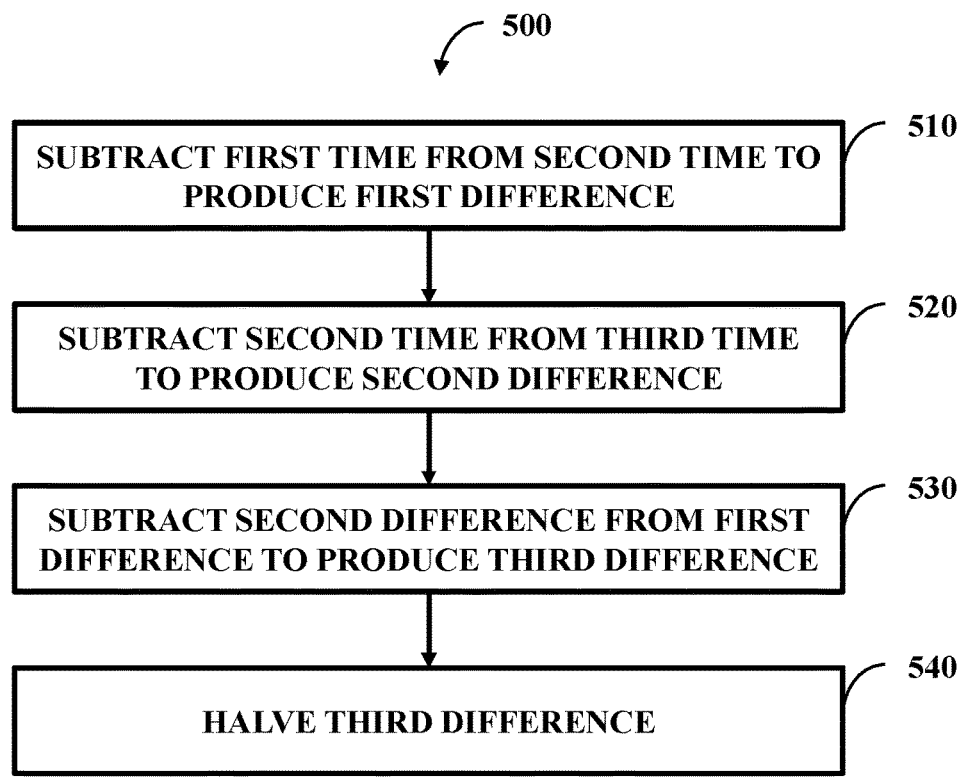
FIG. 5 illustrates one embodiment of a method comprising four actions.

FIG. 5 illustrates one embodiment of a method 500 comprising four actions 510-540 and can be an implementation of the action 420 of FIG. 4. At 510, there can be subtracting the first time from the fourth time to produce a first difference. At 520, subtracting the second time for the third time to produce a second difference can occur. At 530, subtracting the second difference from the first difference to produce a third difference can take place. At 540, there can be halving the third difference to produce the path delay.

Figure 6:
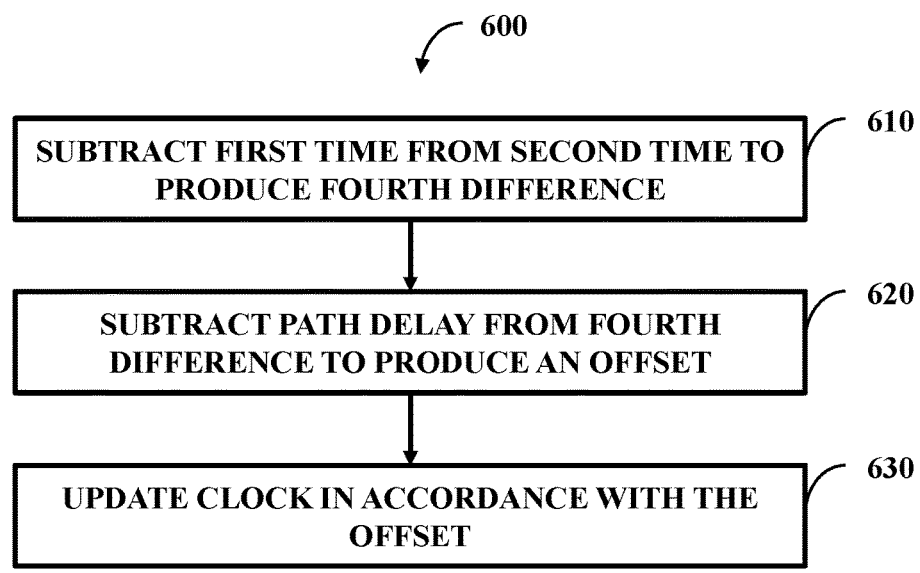
FIG. 6 illustrates one embodiment of a method comprising three actions.

FIG. 6 illustrates one embodiment of a method 600 comprising three actions 610-630. At 610, subtracting the first time from the second time to produce a fourth difference can take place. At 620, subtracting the path delay from the fourth difference to produce an offset from the clock (e.g., the clock 120C of FIG. 1) synchronized with the global navigation satellite system 110 of FIG. 1 can occur. At 630, there can be updating the clock 130C in accordance with the offset from the clock synchronized with the global navigation satellite system 110 of FIG. 1.

Figure 7:
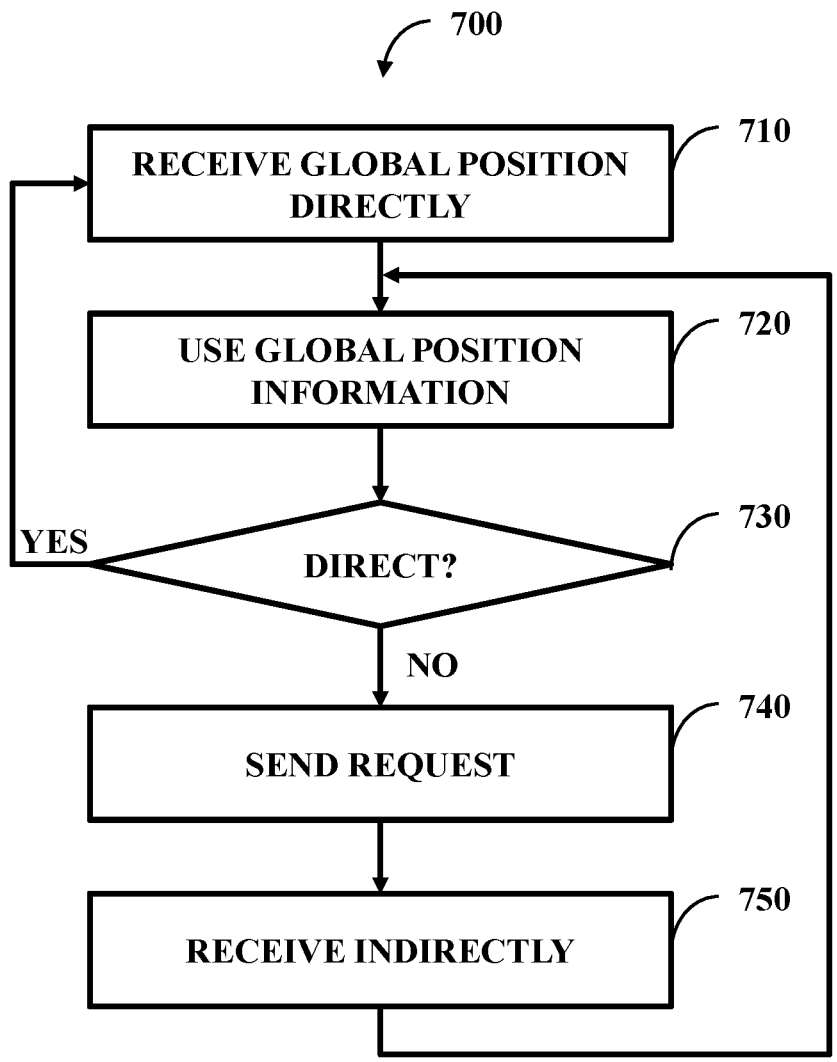
FIG. 7 illustrates one embodiment of a method comprising five actions.

FIG. 7 illustrates one embodiment of a method 700 comprising four actions 710-740 and, in one embodiment, the method 700 can be practiced by the device 130 of FIG. 1. At 710, the device 130 of FIG. 1 can be able to directly receive clock and position information. At 720, the clock and position information can be used, such as updating the clock 130C of FIG. 1. At 730, a determination can be made if the device 130 of FIG. 1 is unable to receive the clock and position information directly from the global navigation satellite system 110 of FIG. 1. If the determination is direction reception is available, then the method 700 can continue back to 710. If the determination is direction reception is not available, then the method 700 can go to 740 where a request can be sent. At 750, the response can be received and can include the second time, the third time, and the global position information set 140 of FIG. 1. An update can occur after this indirect reception in a return to 720 and the determination can be made again at 730.

In one embodiment, after 730, a determination can be made on which device from which to receive indirectly can occur. In one embodiment, actions 710 and 730 do not occur. In an example of this, the device 130 of FIG. 1 is installed underground and is pre-determined to function off the master device 120 of FIG. 1, such as the master device 120 of FIG. 1 functioning as a relay.

Figure 8:
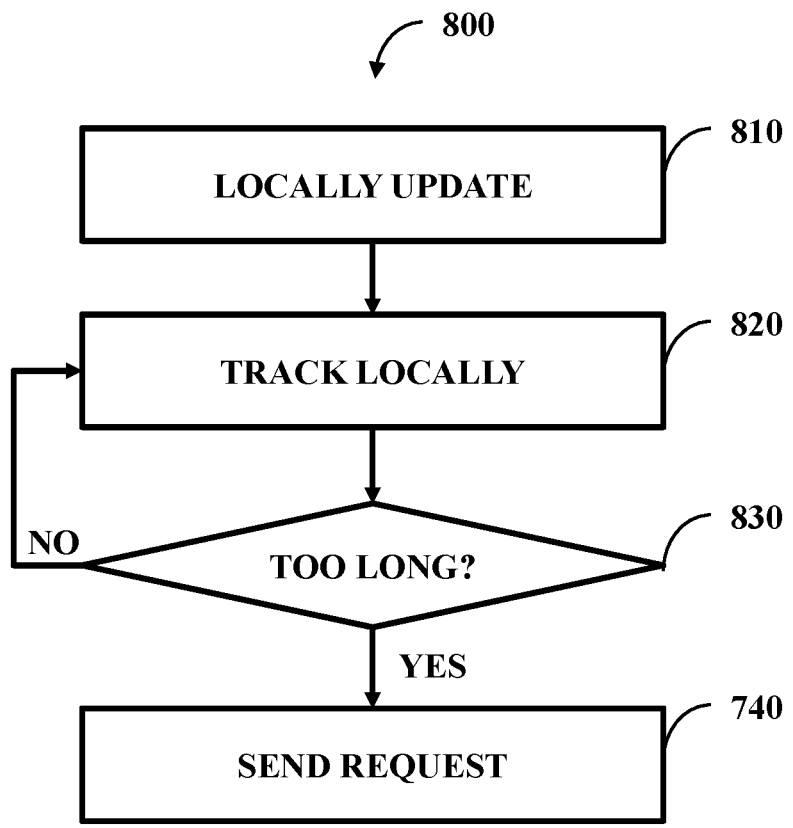
FIG. 8 illustrates one embodiment of a method comprising four actions.

FIG. 8 illustrates one embodiment of a method 800 comprising four actions 810-840 and, in one embodiment, can be practiced by the device 130 of FIG. 1. At 810, a local update can occur, such as in response to receiving a previous update. Instead of constantly communicating with the master device 120 of FIG. 1, the slave device 130 of FIG. 1 can use the inertial measurement unit 130U of FIG. 1 to locally track time and position at 820. Also at 820, measuring a period after the request is sent can take place. At 830, comparing the period against a threshold can take place. If the period does not meet the threshold, the local tracking can continue at 820. If the period does meet the threshold and therefore indicates that too significant of clock drift occurs, at 740 a subsequent request can be sent. With this, the local update can again occur at 810 and the method 800 can repeat.

With this, the master device 120 of FIG. 1 (e.g., four master devices to replicate the four satellites of the global navigation satellite system (GNSS) 110 of FIG. 1) can act as a pseudolite (PL). A Pseudolite Layout (PL) can refer to a network of transmitters, which are placed in a terrestrial and aerial domain, broadcast ephemeris data of position, timing, and health information to PL receivers for positioning, navigation, and timing to cover a local area, while a global navigation satellite system (GNSS) provides the same function from space to cover the entire global area. PL transmitters can be synchronized in time and their own positions are pinpointed very accurately. PL transmitters can rely on GNSS for their own positions and time synchronization. Because PL are referenced to GNSS, the synchronization can be on Coordinated Universal Time (UTC). A GNSS receiver co-mounted with a PL transmitter provides the position and time to the PL transmitter.

A system operating in a networked environment can have improved functionality when synchronized. Essentially GNSS is a one-way time transfer system where a GNSS receiver receives GNSS signals from GNSS satellites to calculate position and time by trilateration. GNSS can provide time synchronization to a networked system. When the system cannot receive GNSS signals, the local clock inside of the system to provide the time synchronization starts to drift and the clock drift error causes problems for the system if the error grows beyond the accuracy needed by the system (thus a basis for a threshold disclosed herein). Aspects disclosed herein can provide the system with other time synchronization from PL, but independently of GNSS, by utilizing a two-way time transfer technique in order to prevent such problems from happening. The accurate time obtained independently of GNSS can also be utilized to verify the authenticity of the GNSS signals.

Two-way time transfer (TWTT) is a mature technique to disseminate accurate time from a master clock to a slave clock over a wired or wireless network. Time information can be transferred over a Network Time Protocol (NTP). To achieve a very accurate time transfer, the path delay and the time offset between the master clock and the slave clock can be measured and the path delay can be removed to correct the slave clock offset. The TWTT technique offers a proactive (e.g., automatic) removal of the path delay by exchanging the time information between the master clock and the slave clock. Provided the path delays can be symmetric on both ways, the TWTT technique can deliver extremely high accuracy regardless of the path delay time or the distance between the master and slave clocks 120C and 130C of FIG. 1, respectively. The TWTT protocols adopted in internet time standards can be Network Time Protocol (NTP) and Precise Time Protocol (PTP).

A PL transmitter typically receives its own position and time (UTC) from a GNSS receiver co-mounted on the same platform. Time information can be embedded in the PL messages. The time information included in the communication 160 of FIG. 1 can comprise a source identification code, a destination identification code, one or two timestamps depending on the time request or the time response and a timing pulse that is converted to one-pulse-per-second timing pulse for synchronization. The slave receiver 130R of FIG. 1 can decode the embedded time information from another PL transmitter (e.g., the master transmitter 120T of FIG. 1), in addition to the normal operation of receiving and decoding GNSS signals from space. Using the time information exchanged for TWTT, the PL transmitter with the combination of the modified receiver can calculate the path delay and the time offset between the PL transmitters. This method allows a transmitter that cannot receive GNSS signals to receive an accurate time from another transmitter that can receive GNSS signals from space or can keep accurate time with an on-board atomic clock such as a Rubidium or Cesium atomic clock. This method can be also utilized as an authentication measure of received GNSS signals. A monitoring station that commands and controls the PL transmitter network can initiate the time information exchange among the PL network if necessary. The frequency of the exchange can be controlled in order to minimize interference on normal PL or GNSS signals (e.g., through use of a timing method similar to actions in the method 800 of FIG. 8). The Inertial Measurement Unit (IMU) 130U of FIG. 1 can provide a moving platform's position change using a dead reckoning process for a certain duration of time (depending on the IMU performance) while GNSS signals are absent. By exchanging the positions (measured by using the IMU's) of the master and the slave platforms, the time transfer accuracy can be improved by taking into account the moving platforms' position changes during a TWTT session.

Figure 9:
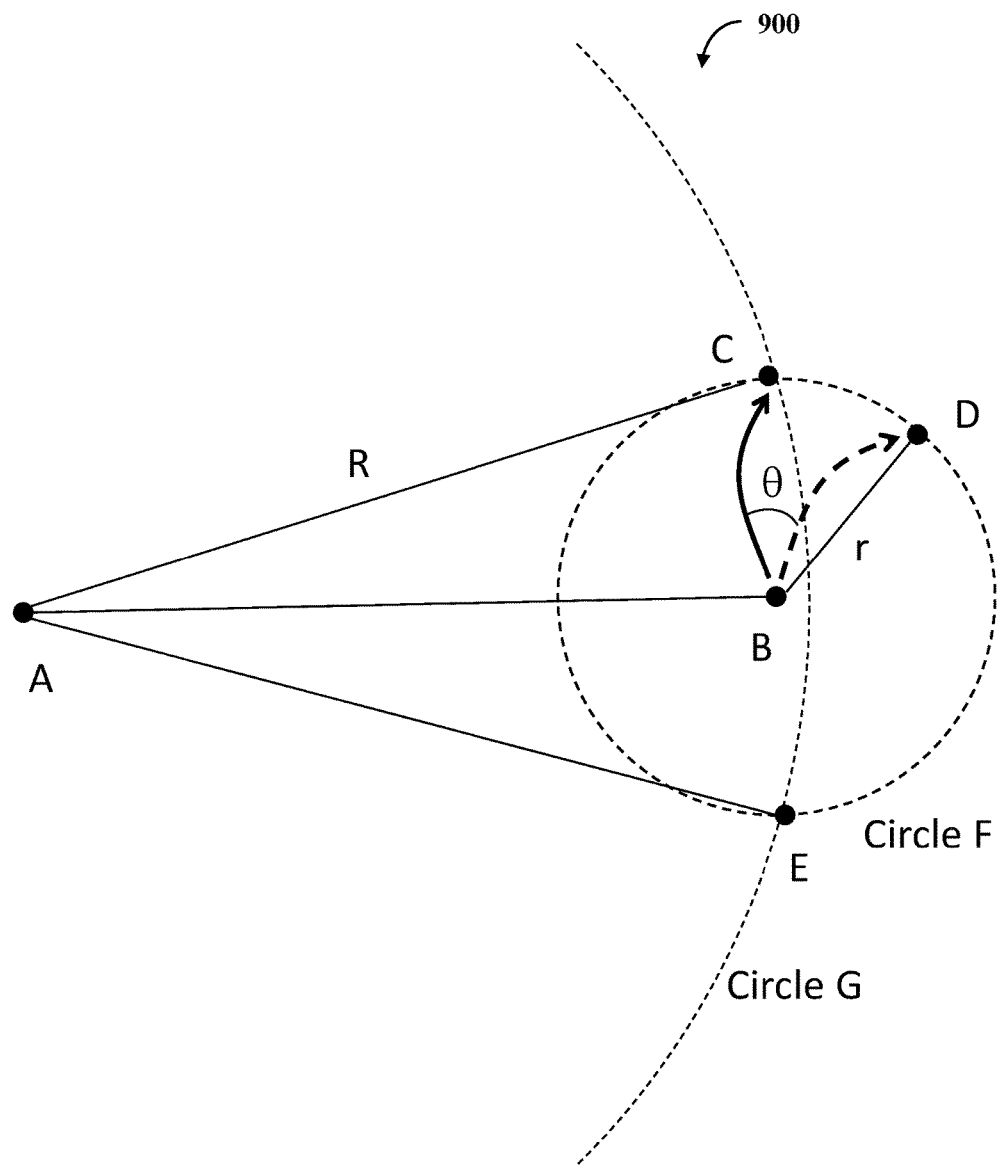
FIG. 9 illustrates one embodiment of a conceptual correction environment.

FIG. 9 illustrates one embodiment of a conceptual correction environment 900. Aspects of the conceptual correction environment can be employed by the calculation component to compensate for a change in movement of the master device 120 of FIG. 1 and/or the slave device 130 of FIG. 1. The master can be stationary at a position A and the slave moves from a position B to a position C during a TWTT session. The move can induce an error in the calculation of the latency because the distance between the master and the slave differs from A-B to A-C. The IMU 130U of FIG. 1 can provide the position change information and calculate the distance difference in order to correct the latency error caused by the difference.

In one embodiment, the IMU 130U of FIG. 1 comprises inertial sensors, such as an accelerometer and gyroscope to measure linear acceleration and angular velocity, respectively. The position change can be estimated from the measurements of those inertial sensors with a dead reckoning process. As one travels for a longer duration, the drifts of the sensor readings increase and thus the estimated position error grows. The drift of the gyroscopes can, in one embodiment, dominate the drift of the accelerometers. Since the drift of the accelerometer can be negligibly small in comparison to that of the gyroscope, the distance of travel measurement can be relatively accurate while the orientation measurement can be less accurate over time. In one example, the drift of the gyroscope can cause an error θ in the orientation measurement, the error results in producing a false position D instead of the correct position C. The C and the D are on the circle F, of which radius r is the same distance between B and C. The TWTT can produce an accurate distance measurement R between the position A and the position C. The correct position C after the move would be at the intersection of the circle F and the circle G of which radius is R. Another intersection position E can be discarded because it is mathematically possible but not physically probable. The θ information obtained from this measurement can also be used to calibrate the gyroscope in real time in order to improve the accuracy of the estimated position thereafter. The accurate distance measurement from a TWTT session can also be applied to calibrate the accelerometers to counteract the drift of the sensors. This concept can be employed to when both the master and the slave are moving at the same time.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:
a global navigation satellite system receiver component configured to receive a global position and time information set from a global navigation satellite system;
a communication unit receiver component configured to receive a unit request for a local position and time information set from a communication unit unable to receive the global position and time information set from the global navigation satellite system;
a transmitter component configured to transmit a communication to the communication unit unable to receive the global position and time information set from the global navigation satellite system in response to the unit request; and
a track component configured to record a time when the unit request is received and a time when the communication is transmitted,
where the communication comprises a local position information set, the time when the unit request is received, and the time when the communication is transmitted and
where the global navigation satellite system receiver component, the communication unit receiver component, the transmitter component, the track component, or a combination thereof, is implemented, at least in part, by way of hardware.

2. The system of claim 1, comprising:
an identification component configured to make an identification when the global navigation satellite system receiver component is unable to receive the global position information and time set from the global navigation satellite system; and
a transfer component configured to send a pseudolite request to a pseudolite for the global position and time information set when the identification is made.

3. The system of claim 2, comprising:
a pseudolite reception component configured to receive a response, at a pseudolite response reception time, to the pseudolite request that comprises the global position and time information set, a pseudolite request reception timestamp, and a pseudolite response send timestamp;
a calculation component configured to calculate a clock offset through use of a send time of the pseudolite request, the pseudolite request reception timestamp, the pseudolite response send timestamp, and the pseudolite response reception time; and
a clock update component configured to cause an update to a clock in accordance with the clock offset.

4. The system of claim 3,
where the calculation component is configured to calculate the clock offset, at least in part, by subtraction of a path delay from a difference of the pseudolite request reception timestamp minus the send time of the pseudolite request.

5. The system of claim 4,
where the calculation component is configured to calculate the path delay, at least in part, by halving a difference from a local difference minus a remote difference, where the local difference is the pseudolite response reception time minus the send time of the pseudolite request, and where the remote difference is the pseudolite response send timestamp minus the pseudolite request reception timestamp.

6. The system of claim 2, comprising:

a check component configured to perform a check on if the global navigation satellite system receiver component is able to receive the global position and time information set from the global navigation satellite system, where, if able, the global navigation satellite system receiver component is configured to receive the global position and time information set from the global navigation satellite system and where, if unable, the transfer component is configured to send a subsequent pseudolite request to the pseudolite for the global position and time information set.

7. A system, comprising:

a calculation component configured to calculate a clock offset through use of a time request sent to a pseudolite and through use of a time response received from the pseudolite in response to the time request; and a clock update component configured to cause an update to a clock in accordance with the clock offset, where the clock is part of an apparatus unable to, at least temporarily, receive a global position information set from a global navigation satellite system, where the time response is obtained from the pseudolite as imbedded information in a communication also imbedded with the global position information set, and where the calculation component, the clock update component, or a combination thereof is implemented, at least in part, by way of non-software.

8. The system of claim 7, comprising:

a determination component configured to determine if the apparatus is able to receive the global position information set from the global navigation satellite system; and a generation component configured to generate the time request in response to the apparatus being unable to receive the global position information set from the global navigation satellite system.

9. The system of claim 7, where the calculation component is configured to compensate for a change in movement of the apparatus from a send time of the time request and a reception time of the time response.

10. The system of claim 7, where the calculation component is configured to calculate the clock offset, at least in part, by subtraction of a path delay from a difference between a minuend of a time the time request is sent from the apparatus minus a subtrahend of a time the time response is received at the apparatus.

11. The system of claim 10, where the calculation component is configured to calculate the path delay, at least in part, by halving a difference between an apparatus time difference minus a pseudolite time difference, where the apparatus time difference is a difference between a time when the time response is received at the apparatus minus a time when the time request is sent from the apparatus, and where the pseudolite time difference is a difference between a time when the time response is sent from the pseudolite minus a time when the time request is received by the pseudolite.

12. The system of claim 11, where embedded in the time response is the time when the time response is sent from the pseudolite, the time when the time request is received by the pseudolite, and a pseudolite global position information set.

13. The system of claim 12, comprising:

an authentication component configured to authenticate the pseudolite global position and time information set through use of the time when the time response is sent from the pseudolite and the time when the time request is received by the pseudolite.

14. The system of claim 7, comprising:

a reception component configured to receive, from the pseudolite, a pseudolite global position information set along with the time response;

a position update component configured to update a retained local position of the apparatus based, at least in part, on the pseudolite global position information set;

an inertial measurement component configured to track a local position of the apparatus based, at least in part, on the updated retained local position of the apparatus and on inertial measurement;

a timer component configured to time a length from when the retained local position was updated;

a comparison component configured to compare the length against a threshold to produce a comparison result; and a transfer component configured to send a subsequent time request if the comparison result indicates that the length meets the threshold, where the time request is also a request for the pseudolite global position information set and where the subsequent time request is also a request for an updated pseudolite global position information set.

15. A non-transitory computer-readable medium that stores processor-executable instructions that when executed by a processor cause the processor to perform a method, the method comprising:

identifying a first time associated with when a request is sent from a slave device to a master device;

identifying a second time associated with when the request is received by the master device from the slave device;

identifying a third time associated with when the master device sends a response to the request to the slave device;

identifying a fourth time associated with when the slave device receives the response from the master device; and calculating a path delay from the first time, the second time, the third time, and the fourth time, where the slave device is unable to receive a global position and time information set from a global navigation satellite system, where the master device is able to receive the global position and time information set from the global navigation satellite system, and where the master device functions as a pseudolite for the slave device.

16. The non-transitory computer-readable medium of claim 15,
where calculating the path delay comprises:
subtracting the first time from the fourth time to produce a first difference;
subtracting the second time for the third time to produce a second difference;
subtracting the second difference from the first difference to produce a third difference; and
halving the third difference to produce the path delay.

17. The non-transitory computer-readable medium of claim 16, comprising:
subtracting the first time from the second time to produce a fourth difference;
subtracting the path delay form the fourth difference to produce an offset from a clock synchronized with the global navigation satellite system; and
updating a clock of the slave device in accordance with the offset from the clock synchronized with the global navigation satellite system.

18. The non-transitory computer-readable medium of claim 17, comprising:
receiving, at the slave device, the response from the master device,
where the response includes the second time, the third time, and the global position and time information set.

19. The non-transitory computer-readable medium of claim 18, comprising:
determining that the slave device is unable to receive the global position and time information set from the global navigation satellite system; and
sending the request in response to the determination.

20. The non-transitory computer-readable medium of claim 19, comprising:
measuring a period after the request is sent;
comparing the period against a threshold; and
sending a subsequent request when the period meets the threshold.

* * * * *